United States Patent [19]

Rutan et al.

[11] Patent Number: 5,769,359
[45] Date of Patent: Jun. 23, 1998

[54] ACTIVE FEEDBACK LOOP TO CONTROL BODY PITCH IN STOL/VTOL FREE WING AIRCRAFT

[75] Inventors: Elbert L. Rutan, Mojave, Calif.; Christophe Chevallier, Alexandria, Va.

[73] Assignee: Freewing Aerial Robotics Corporation, College Park, Md.

[21] Appl. No.: 468,420

[22] Filed: Jun. 6, 1995

Related U.S. Application Data

[63] Continuation-in-part of Ser. No. 332,321, Oct. 31, 1994, abandoned, which is a continuation of Ser. No. 7,130, Jan. 22, 1993, Pat. No. 5,395,073.

[51] Int. Cl.$^6$ ..................................................... B64C 13/16
[52] U.S. Cl. .......................... 244/76 R; 244/48; 244/7 B; 244/81; 244/120
[58] Field of Search .................................. 244/120, 76 R, 244/12.1, 6, 7 R, 56, 48, 76 B, 182, 181, 199, 195, 7 B, 82

[56] References Cited

U.S. PATENT DOCUMENTS

| | | |
|---|---|---|
| 18,181 | 9/1857 | Stelzer . |
| 1,016,929 | 2/1912 | Black . |
| 1,083,464 | 1/1914 | Roche . |
| 1,132,503 | 3/1915 | Wittkowski . |
| 1,472,103 | 10/1923 | Vandevelde . |
| 1,771,277 | 7/1930 | Ingram . |
| 1,772,586 | 8/1930 | Wilford . |
| 1,828,026 | 10/1931 | Clive et al. .............................. 244/120 |
| 1,845,307 | 2/1932 | Maxwell . |
| 1,861,336 | 5/1932 | Cox . |
| 1,885,578 | 11/1932 | Boykow .................................. 249/182 |
| 1,906,005 | 4/1933 | Hall . |
| 2,058,678 | 10/1936 | Fry . |
| 2,063,030 | 12/1936 | Crouch . |
| 2,066,649 | 1/1937 | Sabins . |
| 2,082,674 | 6/1937 | Young . |
| 2,118,987 | 5/1938 | Smith . |
| 2,347,230 | 4/1944 | Zuck . |
| 2,362,224 | 11/1944 | Roseland . |
| 2,416,958 | 3/1947 | Sears . |
| 2,438,309 | 3/1948 | Zimmerman . |
| 2,448,167 | 8/1948 | Baak ....................................... 244/182 |
| 2,481,379 | 9/1949 | Zimmerman . |
| 2,541,922 | 2/1951 | Hosford . |
| 2,542,202 | 2/1951 | McGuire ............................... 244/76 B |
| 2,563,298 | 8/1951 | Winslow . |
| 2,580,312 | 12/1951 | Moore . |

(List continued on next page.)

FOREIGN PATENT DOCUMENTS

| | | |
|---|---|---|
| 790597 | 11/1935 | France . |
| 997796 | 1/1952 | France . |
| 7209 | 3/1909 | United Kingdom . |
| 375530 | 6/1932 | United Kingdom . |
| 732657 | 6/1955 | United Kingdom . |

*Primary Examiner*—Galen L. Barefoot
*Attorney, Agent, or Firm*—Lowe Hauptman; Gopstein & Berner

[57] ABSTRACT

An aircraft control system for controlling an aircraft, particularly a free wing aircraft in low speed or hover regimes. An air speed sensor measures air speed of the aircraft and outputs an air speed signal to a control processor which processes the air speed signal with a speed control input signal. A control actuator actuates an aircraft control surface in response to the control surface control signal. The air speed sensor may include a shaft mounted impeller located in an airstream of the aircraft. A rotational speed sensor, coupled to the impeller, measures a rotational speed of the impeller and outputs a rotational speed signal as the air speed signal. In an alternative embodiment, the air speed sensor may include a vane located in an airstream of the aircraft and deflected in response to air flow in the airstream. In another embodiment, the speed sensor may include an angular position sensor which measures an angle between a free wing and the aircraft fuselage and outputs an angle measurement signal as the air speed signal. The aircraft control surface may comprises a control boom pivotally attached to a fuselage of the aircraft of a trim tab pivotally attached to a fuselage of the aircraft.

3 Claims, 12 Drawing Sheets

U.S. PATENT DOCUMENTS

| | | |
|---|---|---|
| 2,584,667 | 2/1952 | Bockrath . |
| 2,623,712 | 12/1952 | Spratt . |
| 2,708,081 | 5/1955 | Dobson . |
| 2,959,373 | 11/1960 | Zuck . |
| 2,960,285 | 11/1960 | Lopez . |
| 3,006,582 | 10/1961 | Geiger . |
| 3,035,789 | 5/1962 | Young . |
| 3,166,271 | 1/1965 | Zuck . |
| 3,236,182 | 2/1966 | Dahm . |
| 3,415,469 | 12/1968 | Spratt . |
| 3,430,894 | 3/1969 | Strand . |
| 3,477,664 | 11/1969 | Jones . |
| 3,561,702 | 2/1971 | Jones . |
| 3,587,770 | 6/1971 | Flower . |
| 3,624,364 | 11/1971 | Dommasch ............................ 244/182 |
| 3,730,459 | 5/1973 | Zuck . |
| 3,966,142 | 6/1976 | Corbert et al. ......................... 244/120 |
| 4,085,911 | 4/1978 | Nahodyl ................................ 244/120 |
| 4,124,180 | 11/1978 | Wolowicz . |
| 4,415,132 | 11/1983 | Shirk . |
| 4,485,671 | 12/1984 | Kershner .............................. 244/76 B |
| 4,568,043 | 2/1986 | Schmittle . |
| 4,596,368 | 6/1986 | Schmittle . |
| 4,730,795 | 3/1988 | David . |
| 4,795,373 | 1/1989 | Gerard . |
| 4,928,907 | 5/1990 | Zuck . |
| 4,967,984 | 11/1990 | Allen . |
| 5,086,993 | 2/1992 | Wainfan . |
| 5,098,034 | 3/1992 | Lendriet . |
| 5,280,863 | 1/1994 | Schmittle . |
| 5,340,057 | 8/1994 | Schmittle . |

ACTIVE FEEDBACK LOOP TO CONTROL BODY PITCH IN STOL/VTOL FREE WING AIRCRAFT

CROSS REFERENCE TO RELATED APPLICATIONS

This application is a continuation-in-part of application Ser. No. 08/332,321, filed Oct. 31, 1994, now abandoned, which is a continuation of prior application Ser. No. 08/007, 130 filed Jan. 22, 1993, entitled "STOL/VTOL FREE WING AIRCRAFT WITH ARTICULATED TAIL BOOM," now U.S. Pat. No. 5,395,073, the disclosure which is incorporated by reference herein in its entirety.

TECHNICAL FIELD

The present invention relates to an active feedback control loop to maintain stability of a STOL/VTOL aircraft. The active feedback control loop of the present invention has particular application to a STOL/VTOL free wing aircraft with an articulated control boom or other control surfaces. However, it is intended that the use of the control loop disclosed herein on a fixed wing aircraft be considered within the scope of the present invention.

BACKGROUND ART

As disclosed in U.S. Pat. No. 5,340,057, issued Aug. 23, 1994, and incorporated herein by reference, free wing aircraft, i.e., aircraft having a wing free for rotation about a spanwise axis to maintain a constant angle of attack with the relative wind, have been found to be particularly useful in short take-off and landing (STOL) and vertical take-off and landing (VTOL) applications. More specifically, the aircraft of the type described herein typically has a free wing comprised of left and right wings projecting on opposite sides of the fuselage and mounted to the fuselage for free joint pivotal movement about a spanwise axis forward of the aerodynamic centers and controlled pivotal movement relative to one another for roll control during vertical and horizontal flight, as well as transitions therebetween. Free wing aircraft are relatively immune to turbulence and the like and also may provide high lift and good anti-stall characteristics. Thus, free wing aircraft are particularly appropriate for remotely piloted vehicles (RPV) or unmanned aerial vehicles (UAV's) where low speed or near hovering flight is required. Additionally, the stability of the free wing makes it an ideal aerial platform for instrumentation mounts (video camera, infrared sensor or the like).

Although the free wing aircraft is highly stall resistant, during manned or unmanned low speed flight, it has been discovered that a velocity may be reached where, although a stall is not imminent, the aircraft may become unstable in yaw and pitch. Such conditions may occur in a UAV where the vehicle may be programmed to fly through a prescribed course using an internal navigation system (e.g., inertial navigation system GPS or the like) or in an RPV where the pilot may be controlling the aircraft remotely (e.g., radio control) and cannot receive the sensory feedback that a pilot receives in a manned aircraft.

Thus a control mechanism to control a free wing STOL/VTOL aircraft to maintain the aircraft in a stable region of the performance envelope would be highly desirable.

SUMMARY OF THE INVENTION

It is therefore an object of the present invention to maintain a free wing aircraft within a stable realm of its performance envelope at zero or low indicated air speeds.

The control system of the present invention includes an air speed sensor for measuring air speed of the aircraft and outputting an air speed signal. A control processor, coupled to the air speed sensor, receives and processes the air speed signal from the air speed sensor and a speed control input signal and outputs a control surface control signal. A control actuator is coupled to the control processor and actuates an aircraft control surface in response to the control surface control signal.

The air speed sensor may include a shaft mounted impeller located in an airstream of the aircraft. The impeller rotates in response to air flow in the airstream. A rotational speed sensor, coupled to the impeller, measures a rotational speed of the impeller and outputs a rotational speed signal as the air speed signal. The rotational speed sensor may comprise an optical shaft encoder.

In an alternative embodiment, the air speed sensor may include a vane located in an airstream of the aircraft. The vane is deflected in response to air flow in the airstream. A position sensor coupled to the vane measures the position of the vane and outputs a position sensing signal as the air speed signal. The position sensor may comprises a first limit switch which is actuated when the vane is deflected by a first predetermined distance. The position sensor may further comprise a second limit switch actuated when the vane is deflected by a second predetermined amount.

The aircraft may comprise a free wing aircraft including a free wing rotatably coupled to a fuselage. In such an embodiment, the speed sensor may include an angular position sensor, coupled to the free wing and the fuselage, for measuring an angle between the free wing and the fuselage and outputting an angle measurement signal as the air speed signal.

The aircraft control surface may comprise a trim tab pivotally attached to a fuselage of the aircraft and coupled to the control actuator. The control actuator pivots the trim tab in response to the control surface control signal. In an alternative embodiment, the aircraft control surface comprises a control boom pivotally attached to a fuselage of the aircraft and coupled to the control actuator. The control actuator pivots the control boom in response to the control surface control signal.

A method of controlling an aircraft is provided. The air speed of the aircraft is measured and output as an air speed signal. The air speed signal is processed with a speed control input signal and a control surface control signal is output. An aircraft control surface is actuated in response to the control surface control signal.

BEST MODE FOR CARRYING OUT THE INVENTION

Free wing aircraft have been developed by the present inventors, for example, as set for in co-pending application Ser. No. 08/007,130, and U.S. Pat. No. 5,340,057. A first embodiment of a free wing aircraft, as set forth in U.S. Pat. No. 5,340,057, utilizes control flaps on the fuselage to maintain fuselage angle and thrust angle to allow the airplane to operate in STOL/VTOL regions, and to maintain and control direction of flight. A second embodiment of a free wing aircraft, set forth in co-pending application Ser. No. 08/007,130, employs an articulated control boom to control fuselage angle and thrust angle, to allow the aircraft to operate in VTOL/STOL regions, and to maintain and control direction of flight.

Figure 1:
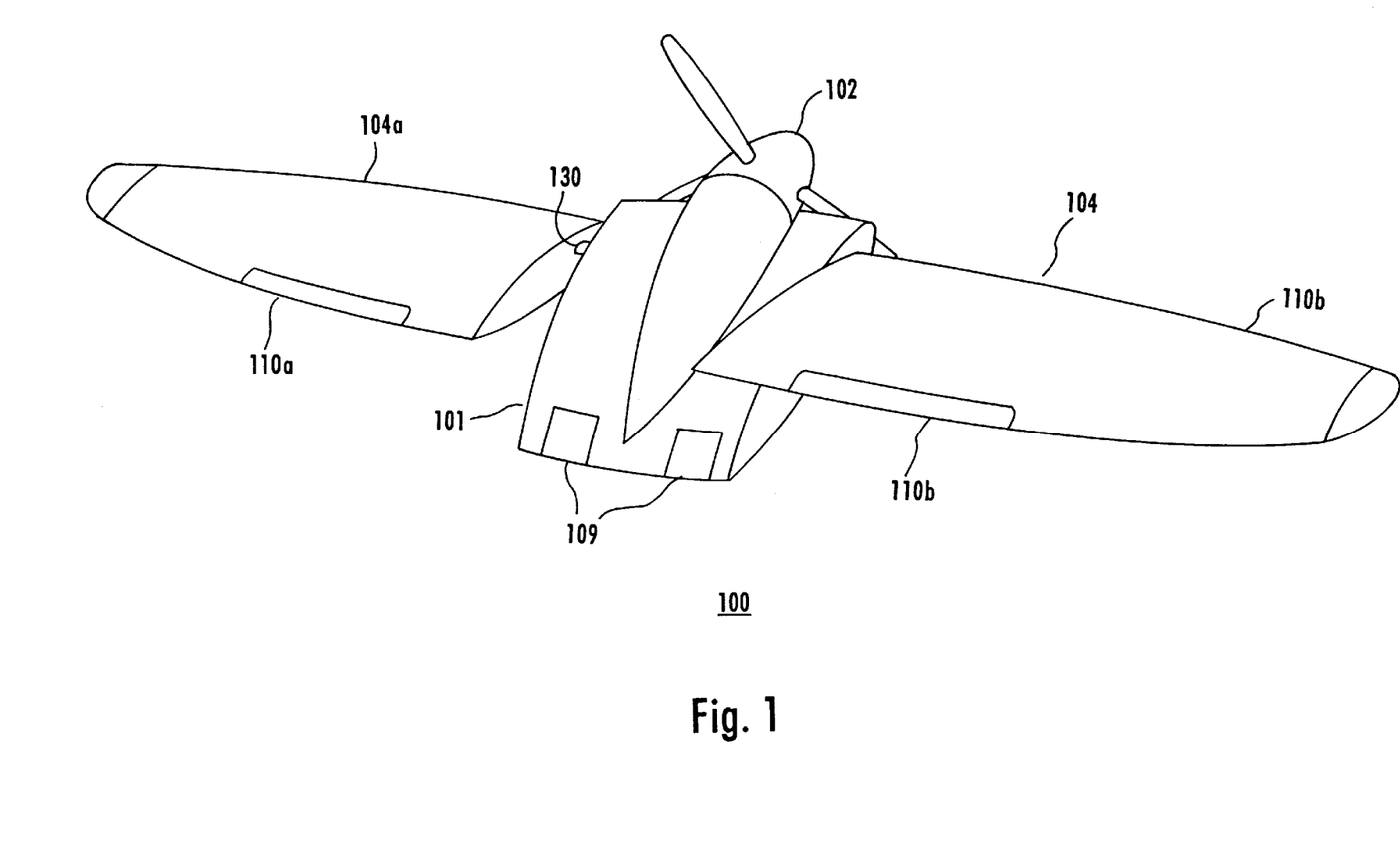
FIG. 1 is a rear perspective view of an aircraft incorporating a first embodiment of the present invention.

FIG. 1 is an illustration of yet another embodiment of a free wing aircraft 100 which operates without a traditional aircraft tail. A fuselage 101 houses the aircraft engine, fuel supply, and the like, which is used to drive propeller 102. While a single propeller for the propulsion system is illustrated at 102 in FIG. 1, it will be appreciated that other types of propulsion systems may be utilized. For instance, the propulsion system may comprise counterrotating propellers or other thrust generating devices including jet engines, ducted fans, unducted fans, rocket motors or the like.

Attached to fuselage 101 is a free wing 104. As disclosed in the above-reference patents, free wing 104 is free to rotate or pivot about its spanwise axis 122. Free wing 104 includes left and right wings 104a and 104b, extending from opposite sides of fuselage 101 and which wings 104a and 104b are coupled together to collectively freely pivot about axis 122. The left and right wings 104a and 104b can be, however, adjustable in pitch relative to one another, as described in the above-referenced patents. Free wing 104 may also be provided with ailerons or flaps 110a and 110b to maintain or control direction or provide additional lift.

Fuselage 101 is provided with one or more trim tabs 109 to control vehicle direction and attitude. As shown in FIG. 1, trim tabs 109 may comprise a pair of tabs mounted on the upper surface of fuselage 101 on either side of the central axis of fuselage 101 and may be formed similar to a speed brake or the like. Alternately, trim tabs 109 may be formed in a similar manner to ailerons. Trim tabs 109 may be selectively or differentially operated to compensate for torque generated by propeller 102, especially in hovering or near hovering operating conditions. To this end, trim tabs 109 may be provided asymmetrically.

Figure 2:
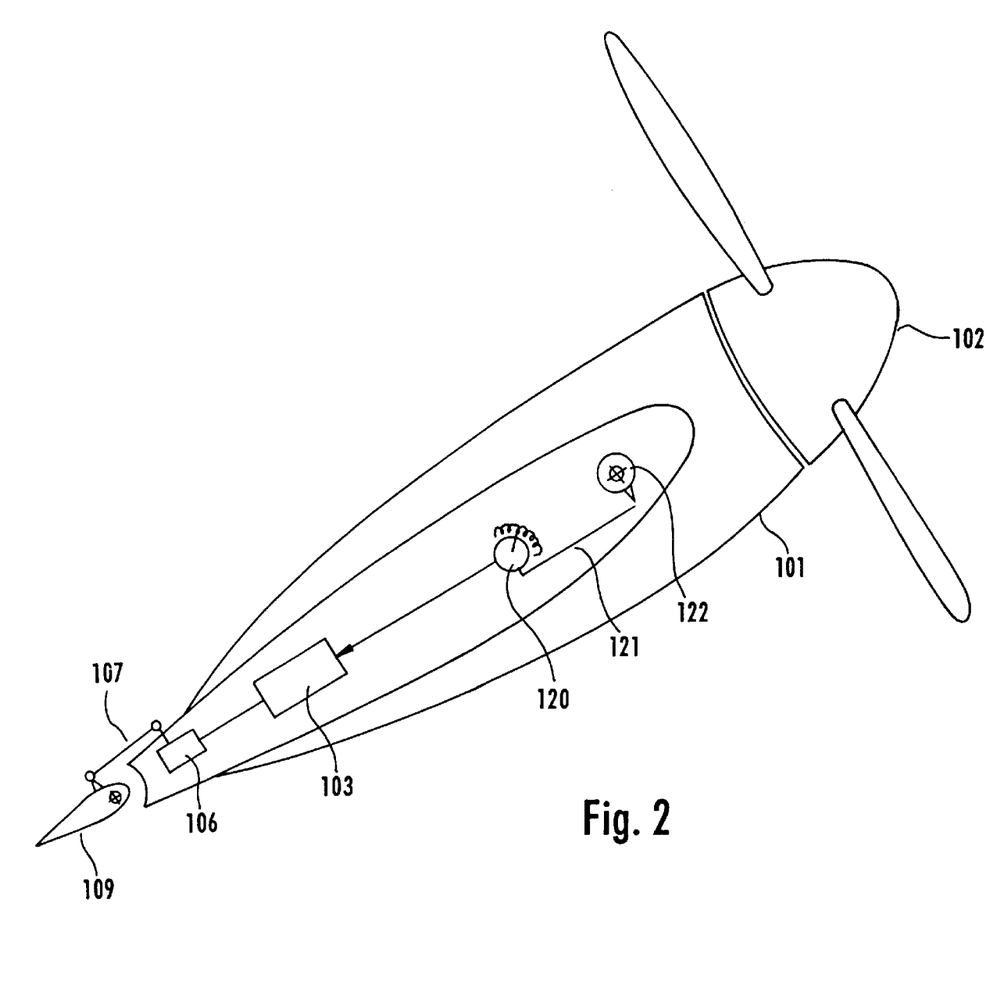
FIG. 2 is a cross-section view of the fuselage of the aircraft of FIG. 1 depicting one embodiment of an altitude control system of the present invention.

Trim tabs 109 may be driven by various known aircraft linkages and actuators, including manual control wires, push-pull control tubes, hydraulic systems, screw jacks (electric or hydraulic) or the like. In the best mode contemplated, as shown in FIG. 2, an actuator 106 is coupled to each of trim tabs 109 by means of a mechanical control linkage 107. Preferably, actuator 106 comprises an electric servo-actuator, such as a model FP S-148, manufactured by Futaba corporation, or model SSPS105 manufactured by TONE.

Referring again to FIG. 2, housed within fuselage 101 are control circuits which may include the feedback control of the present invention as well as flight controls. Flight controls may comprise radio controls for an RPV, an automated (e.g., computer) control for an UAV, or traditional pilot controls (e.g., joystick, control yoke, rudder pedals, or the like) for a manned aircraft. Alternately, any combination of these controls may be provided. For example, for an RPV, some automated controls may be provided to allow for partial automated control of vehicle functions. Similarly, in a manned vehicle, some automated controls (e.g., autopilot) may be provided. Also, as is known in the art, so-called "fly by wire" control systems may be provided to dynamically stabilize an aircraft in any of RPV, UAV or manned embodiments.

The control system of the present invention will be described generally with reference to FIG. 2. Free wing 104 is coupled to fuselage 101 at axis 122 by a structural tube 130. A position sensor 120 is provided, coupled to structural tube 130 by a linkage 121. Position sensor 120 determines the angle between free wing 104 and the centerline of fuselage 101 and measures the changes in this angle. Position sensor 120 may comprise any one of various known sensors including but not limited to a potentiometer, optical sensors, Hall effect sensors or the like. In the preferred embodiment, position sensor 120 comprises a potentiometer.

Position sensor 120 and actuator 106 are both connected to a processor 103 which may comprise a microprocessor control, hydraulic, pneumatic or fluidic control, programmable logic array, electronic control or the like. It is preferred that processor also function as a receiver for receiving pilot commands, as discussed below. Processor 103 may additionally comprise a control circuit, as discussed above, for controlling the aircraft, a portion of which may be programmed to implement the feedback loop of the present invention. In the preferred embodiment, processor 103 comprises a processor receiver model number 7UAPS control system manufactured by Futaba corporation, or an equivalent model manufactured by ACE R/C.

Figure 3:
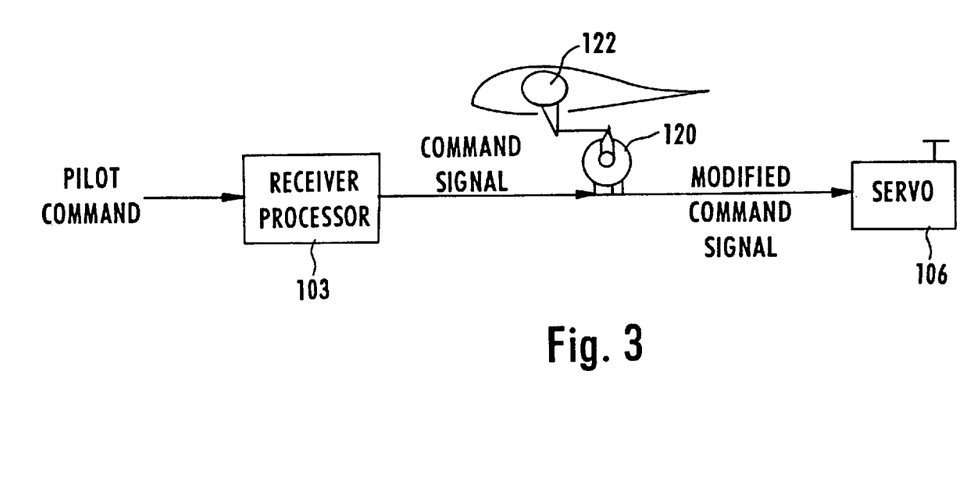
FIG. 3 is a control block diagram, partly schematic, for the embodiment of FIG. 1.

FIG. 3 is a schematic representation of the operation of the processor logic for the embodiment of FIGS. 1 and 2. In FIG. 3, a pilot command is input to processor 103. Specifically, the embodiment of FIGS. 2 and 3 describe an altitude hold system. The pilot command may comprise a manual input from a human pilot, a computer command from a fly by wire system, an automated (or programmed) command from an UAV control system or a remote control command (e.g., radio control) received in an RPV control system. Typically, the pilot command may comprise a speed command, commanding the aircraft to fly at a particular ground speed or air (indicated) speed. However, it is also contemplated within the scope of this invention that the pilot command may comprise an altitude command, as discussed below with reference to FIGS. 8A–8E, or any other suitable command.

Processor 103 outputs a command signal to actuate servo-actuator 106 to control trim tabs 109. The command signal may be, for instance, a voltage, a pulse width modulation, a digital word, or a frequency. As discussed above, the operation of trim tabs 109 may be used to control fuselage angle and thus thrust angle. By altering thrust angle, aircraft 100 may be slowed to hovering or near hovering conditions without substantially reducing lift. However, below certain velocities, free wing aircraft 100 may enter an unstable portion of the performance envelope where excessive yaw or roll may be induced, as the flow of air over the control surfaces of the airplane is reduced to the point where effective control is lost.

In order to prevent free wing aircraft from entering an unstable domain, the command signal from processor/ receiver 103 may be altered by a voltage generated by position sensor 120 to form a modified command signal, which is then fed to servo-actuator 106 to actuate trim tabs 109. As position sensor 120 is coupled to pivot point 122, the amount of modification to the command signal is directly proportional to the change in angle between the centerline of fuselage 101 and free wing 104. Position sensor 120 may alternatively output a position angle which may be fed to processor 103, in which case processor 103 modifies the command signal to servo-actuator 106.

Figures 4, 5:
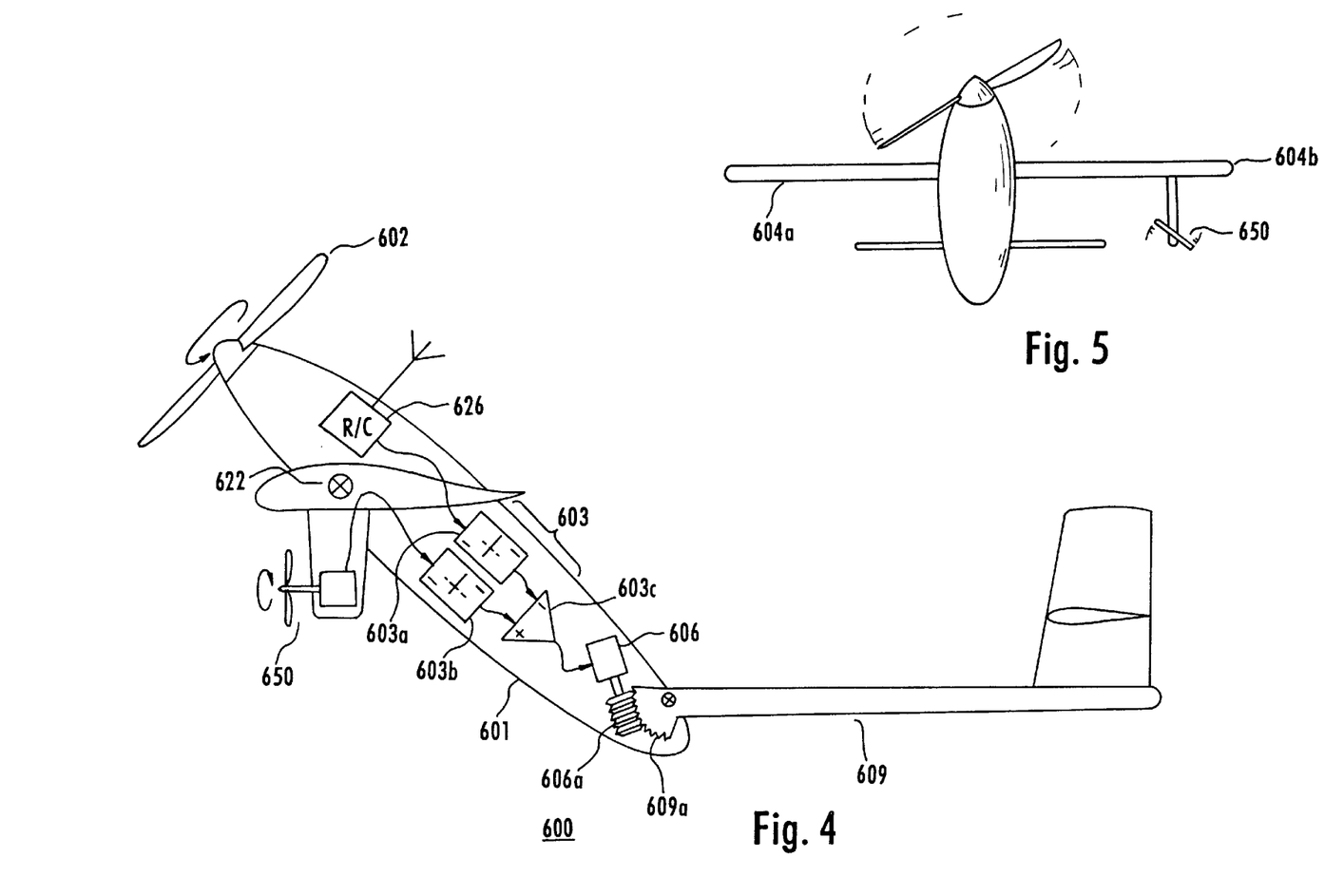
FIG. 4 is a cross-section view of the preferred embodiment of the present invention depicting a free wing aircraft with an articulated control boom and the air speed hold system of the present invention.
FIG. 5 is a front view of the aircraft of FIG. 4.

FIGS. 4 and 5 are views of the preferred embodiment of an air speed hold system of the present invention for a free wing aircraft having an articulated control boom. Such an aircraft is disclosed, for example, in co-pending application Ser. No. 08/007,130.

A center fuselage portion 601 houses the aircraft engine, fuel supply, and the like, which is used to drive propeller 602. Although depicted here as driven by a propeller 602, free wing aircraft 600 may also be driven by counterrotating propellers or other thrust generating devices mounted to the fuselage including jet engines, ducted fans, unducted fans, rocket motors or the like.

Housed within fuselage 601 are control circuits 626 which may include the feedback control of the present invention as well as flight controls. Flight controls may comprise radio controls for an RPV, an automated (e.g., computer) control for an UAV, or traditional pilot controls (e.g., joystick, control yoke, rudder pedals, or the like) for a manned aircraft. Alternately, any combination of these controls may be provided. For example, for an RPV, some automated controls may be provided to allow for partial automated control of vehicle functions. Similarly, in a manned vehicle, some automated controls (e.g., autopilot) may be provided. Also, as is known in the art, so-called "fly by wire" control systems may be provided to dynamically stabilize an aircraft in any of RPV, UAV or manned embodiments. In the preferred embodiment of FIG. 4, control system 626 includes a radio control receiver.

Attached to fuselage 601 is a free wing 604 which comprises a pair of wings 604a and 604b (i.e., left and right) which are coupled together to a hinge tube and pivot mechanism so as to allow free wing 604 to pivot relative to fuselage 601 around pivot point 622. Free wing 604 may also be provided with ailerons or flaps (not shown) to maintain or control direction or provide additional lift.

Attached to fuselage 601 is an articulated control boom 609 which is provided to control vehicle direction and attitude. Articulated boom 609 may include both rudder and elevator or other combination of control surfaces (e.g., "ruddervator"). In addition, although depicted as a single articulated control boom in FIG. 5, twin articulated control booms may also be provided.

Figure 4A:
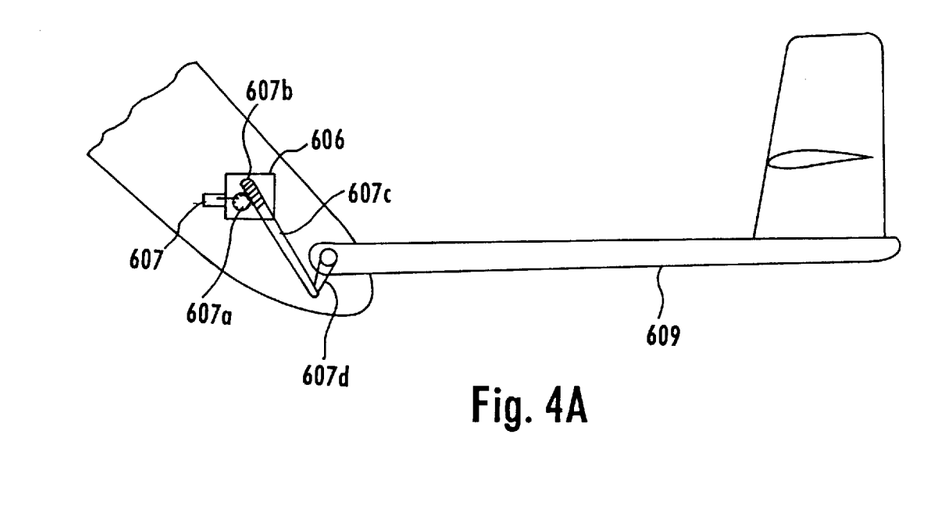
FIG. 4A is a cross-section view similar to FIG. 4 of an alternative embodiment of the present invention.

Articulated control boom 609 is articulated relative to fuselage 601. Articulated control boom 609 may be driven by various known aircraft linkages and actuators, including manual control wires, push-pull control tubes, hydraulic systems, screw jacks (electric or hydraulic) or the like. In the preferred embodiment, the actuator 606 comprises a screw jack type actuator as depicted in FIG. 4 wherein the output of actuator 606 turns a screw jack 606a meshing with teeth 609a on articulated control beam 609. In an alternative embodiment, depicted in FIG. 4A, actuator 606 drives a motor 607 including an output gear 607a. Gear 607a drives a jack screw 607b connected to articulated tail boom 609 via a linkage 607c and a control rod 607d.

In flight, the aircraft 600 of FIG. 4 receives control signals though radio control 626 to control speed, direction, and attitude of aircraft 600. In order to control thrust angle of aircraft 600, control signals from radio control 626 may drive control circuit 603 to actuate actuator 606 to change the relative angle between articulated control boom 609 and fuselage 601. Articulated control boom 609 maintains a relatively constant angle relative to the angle of attack of aircraft 600. By altering the angle between fuselage 601 and articulated control boom 609, the thrust angle of aircraft 600 is altered, providing increased or decreased lift and thrust vectoring. By altering thrust angle, aircraft 600 can operate in VTOL/STOL or near hovering conditions, while still achieving high speed flight.

As discussed above in connection with FIGS. 1 and 2, however, at certain low speeds encountered in near hovering conditions, aircraft 600 may become unstable. Although in such low speed conditions, free wing 604 may not be stalled per se, the directional control of the aircraft may become unstable due to the lack of airflow over control surfaces of aircraft 600.

In order to prevent aircraft 600 from entering such an unstable regime of operation, the control system of the present invention is provided to monitor air speed (indicated speed) of aircraft 600 and alter the relative angle between articulated control boom 609 and fuselage 601 to maintain aircraft 600 in a stable control region.

In the embodiment of FIG. 4, an aircraft low speed sensor is used to measure air speed (indicated speed) of aircraft 600. Traditional techniques for measuring aircraft indicated speed (e.g., pitot tube or the like) may be unsuitable for measuring aircraft speed at very low velocities (e.g., 35 knots or less). The accuracy and linearity of a pitot tube drop off rapidly with the decrease between total and static pressure. Further, pressure sensors capable of measuring such low pressure differentials (typically in inches or tenths of an inch of water) are costly and cumbersome. Low cost or compact pressure sensors generally do not have the accuracy necessary to measure such low pressure differentials.

Figure 6:
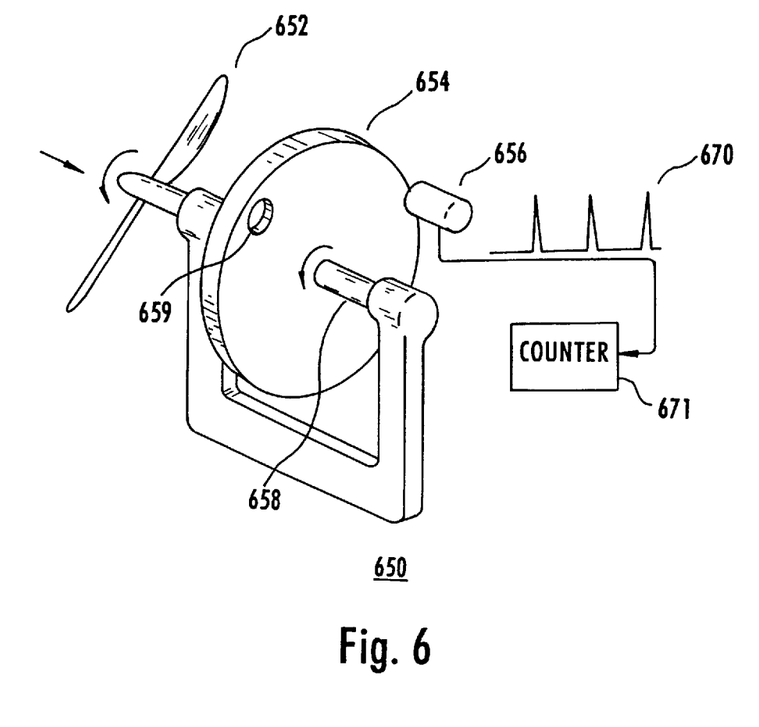
FIG. 6 is a perspective view of an air speed hold system for use in the present invention.

Thus, the control system of the present invention incorporates two air speed indicators for indicating low aircraft speeds. FIG. 6 depicts the preferred embodiment of the airspeed indicator 650 of the present invention, illustrated mounted on aircraft 600 in FIGS. 4 and 5. Airspeed indicator 650 comprises a small impeller 652 mounted to rotating shaft 658 coaxially with speed disk 654. Speed disk 654 is provided with an orifice or grating 659 and optical sensor 656. Optical sensor 656 senses light from a light source (not shown) passing through speed disk 654. Although only one hole 659 is depicted in FIG. 6, other numbers of holes may also be used, along with an grating or chopper type wheel. In addition, although in the preferred embodiment an optical sensor is used, other types of rotational sensors may also be used, including inductive or magnetic sensors, Hall effect sensors or the like.

The output of sensor 656 is depicted as waveform 670, a series of pulses synchronous with the rotation of speed disk 654. Waveform 670 is fed to counter 671 which counts the number of pulses over a standard period of time and outputs an analog or digital signal proportional to the rotational speed of speed disk 654. The relationship between aircraft indicated speed (airspeed) and rotational speed (e.g., RPM) of impeller 652 is fairly linear for low speed. However, since in the present invention only a given airspeed, in the linear range, need be detected, non-linearities in the RPM/airspeed relationship need not be compensated.

Referring back to FIG. 4, the output of counter 671 is fed to control circuit 603. Control circuit 603 include signal processor 603a and 603b, and differential amplifier 603c. Signal processor 603a receives a control signal from radio controller 626 and converts this signal into an actuator control signal 606. Signal processor 603a may comprise an A/D converter, analog amplifier, digital processor or similar components, as is known in the control art. Further signal processor 603 may comprise a portion of a microcontroller, as will be discussed below in conjunction with FIGS. 8A–8F.

Signal processor 603b similarly receives the output from counter 671 and processes this signal to generate a modifying signal to modify the actuator control signal output from signal controller 603a. Digital information representative of the actual value of the outputs of signal processors 603a and 603b are fed to differential amplifier 603c where the difference of the two signals is output. If the airspeed of aircraft 600 is below a predetermined threshold (e.g, 25 knots), signal processor 603b may generate a positive control voltage to increase the relative angle between articulated control boom 609 and fuselage 601, (i.e., decrease thrust angle) and thus increase airspeed of aircraft 600. If aircraft 600 is above the predetermined speed, signal processor 603b may generate a negative control voltage to decrease the relative angle between articulated control boom 609 and fuselage 601 and thus decrease the air speed down to the predetermined air speed. If aircraft 600 is at the predetermined speed, signal processor 603b may generate no signal. Actuator 606 may be provided such that for a given output voltage, a proportional relative angle is maintained between articulated control boom 609 and fuselage 601.

Figure 7:
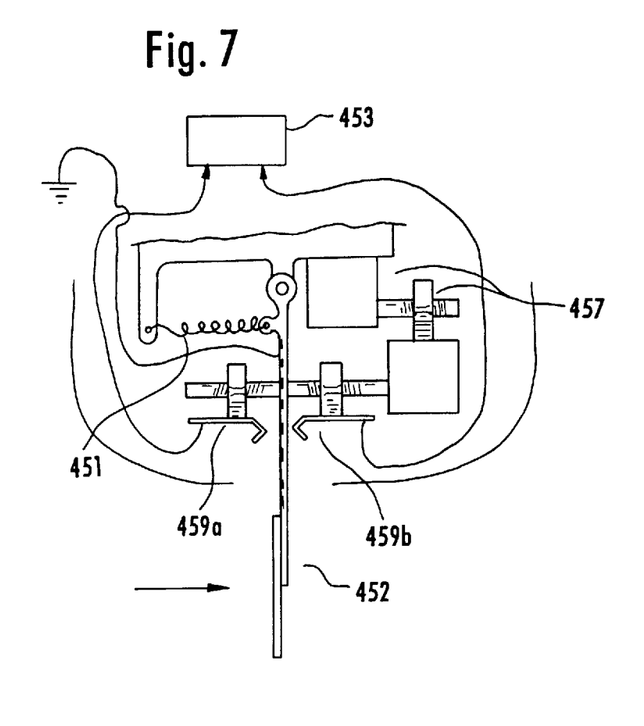
FIG. 7 is a cross-section view of a second embodiment of an air speed hold system for use in the present invention.

FIG. 7 depicts an alternative embodiment of the airspeed indicator of the present invention. Sensor 450 of FIG. 7 comprises vane 452 placed in the airstream of aircraft 600. At relatively high vehicle speeds, vane 452 is deflected rearward by air flow. Spring 451 is provided to pull vane 452 against the predominate air flow. When aircraft 600 falls below a predetermined air speed, pressure on vane 452 due to air flow decreases, and spring 451 pulls vane 452 forward.

Limit switches 459a and 459b are provided coupled to vane 452. When no air flow is present, vane 452 is pulled forward by spring 451 against limit switch 459a, grounding a signal line to control 453. When a first predetermined air flow is present, vane 452 is deflected rearward, as shown in the arrow in FIG. 7, and cane 452 breaks contact with limit switch 459a. When a second, greater, predetermined air flow is present, vane 452 is deflected further rearward, activating limit switch 459b and grounding a signal wire to control 453. Thus, two signals may be provided to control 453 to determine whether air flow is below a first predetermined limit, or above a second predetermined limit. Control 453 may process these signals and output a third signal indicating relative air speed.

The use of first and second limit switches 459a and 459b provides a built in dead-band between lower and upper air speed limits. This dead-band may compensate for transient wind conditions, gusts, or the like, or transient speed changes in the aircraft. Alternately, one limit switch may be provided to measure a speed threshold condition, without departing from the spirit and scope of the present invention.

Adjustment screws 457 are provided to adjust the threshold air speeds needed to activate limit switches 459a and 459b. Limit switches 459a and 459b may be suitably replaced by a linear potentiometer, Hall effect sensor or the like to provide a position signal to continuously measure the deflection of vane 452. The dead-band provided by limit switches 459a and 459b may be provided by suitable programming control 453 to compare the output of a continuous position sensor.

Figure 8:
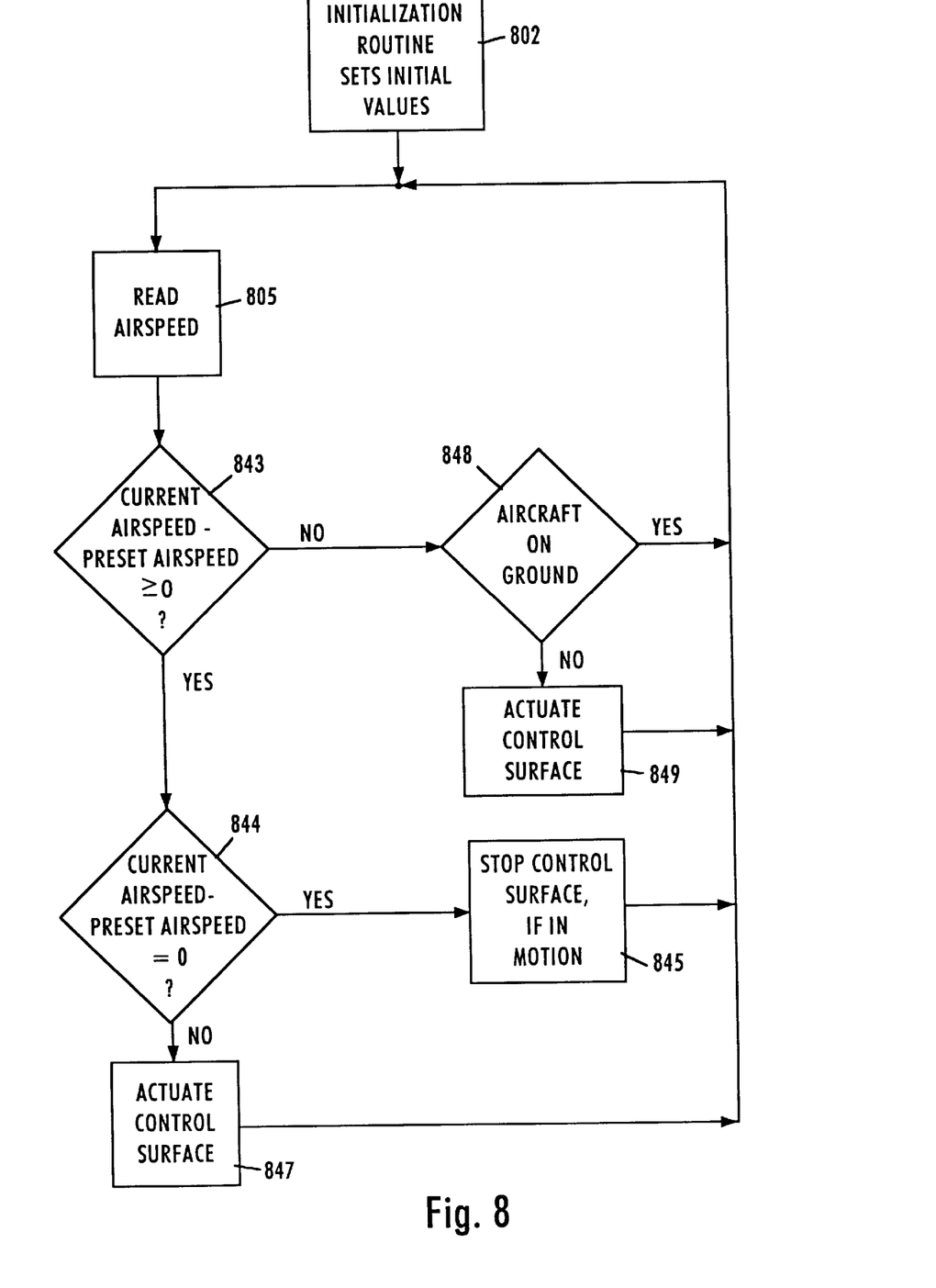
FIGS. 8, 8A–8F are block diagrams of the feedback control program for use with the present invention.

FIG. 8 is a basic flow chart for the processor control of the present invention. FIGS. 8A–8F is a detailed processor control flow chart for the embodiment of FIGS. 4 and 5. Referring first to FIG. 8, processing begins at step 802 with the initialization routine which sets the initial values of the processor. The airspeed of the aircraft is read in step 805, whereupon the current airspeed is compared to the preset airspeed (step 843). If the difference between the current airspeed and the present airspeed is not greater than or equal to 0, i.e., the current airspeed is less than the preset airspeed, processing passes to step 848, where it is determined whether the aircraft is on the ground. If the aircraft is on the ground, processing passes back to step 805, where the airspeed of the aircraft is again read. If the aircraft is not on the ground, then the control surface is actuated at step 849, whereupon processing passes back to step 805.

If it is determined in step 843 that the current airspeed is greater than or equal to the preset airspeed, processing passes to step 844, wherein it is determined whether the current airspeed equals the preset airspeed. If the current airspeed does not equal the preset airspeed, i.e., the current airspeed is less than the preset airspeed, the control surfaces are actuated at step 847, and processing returns to step 805. If the current and preset airspeeds are equal, the control surface, if in motion, is stopped (step 845), and processing returns to step 805. Thus, it can be seen once actuation of the control surface is initiated, either at step 849 or step 847, the control surface will continue to be actuated until the current airspeed equals the preset airspeed, whereupon the movement of the control surface will be stopped at step 845.

Turning to FIGS. 8A–8F, while the processor for the embodiment of FIGS. 4 and 5 is shown, it is expected that one skilled in the art could modify the processor control of FIGS. 8A–8F to control the embodiment of FIGS. 1 and 2. A suitable microprocessor may be used to implement the control system of the present invention. In the preferred embodiment, an eight bit microprocessor from the Intel™ MCS-51 family of microprocessors (e.g., 8051, 8031, 8032 or the like) may be used.

Figure 8A:
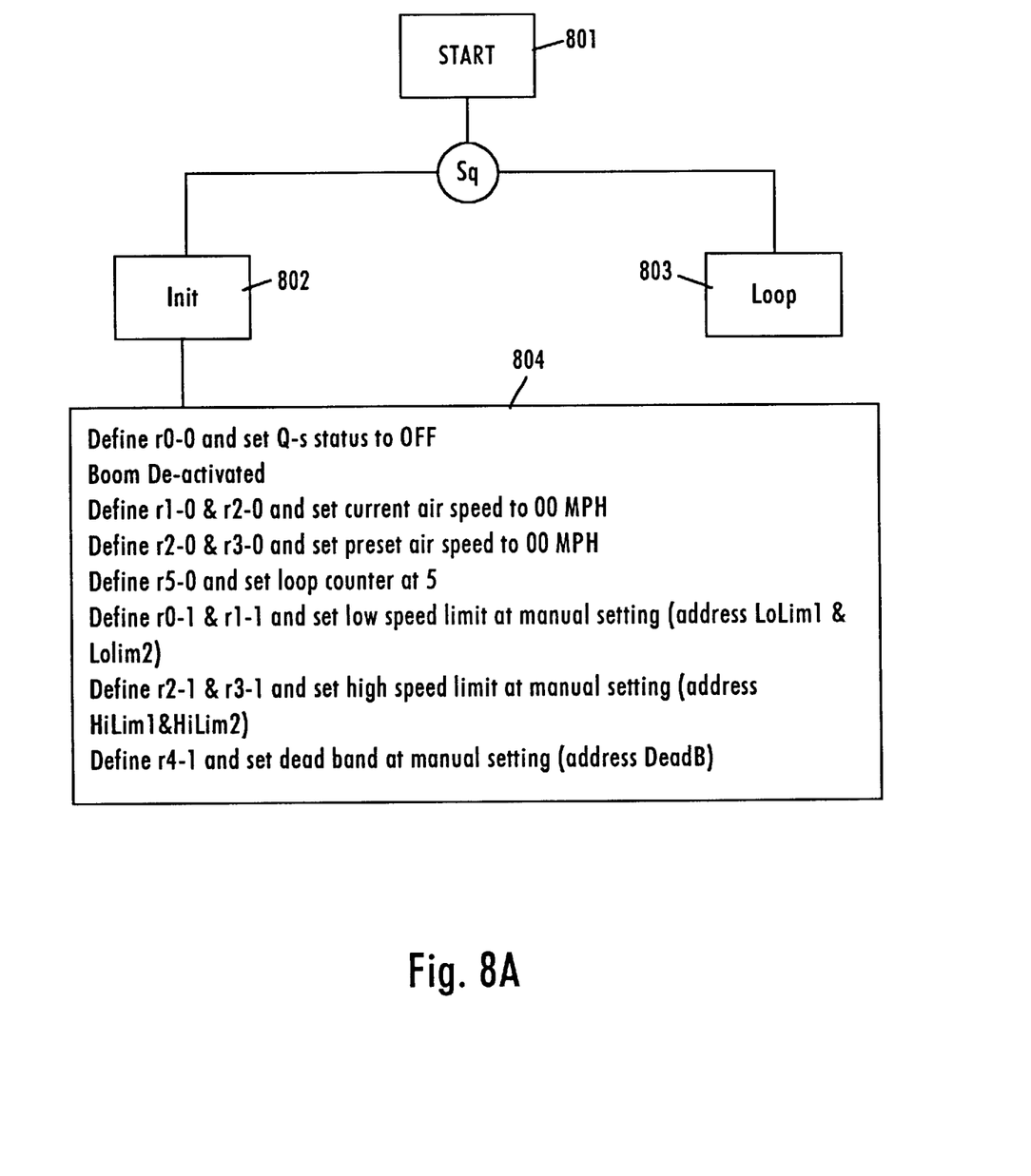

FIG. 8A depicts the main control loop for the program. In the flow charts of FIGS. 8A–8F, the nomenclature "Sq " indicates "sequence", indicating a sequence of iterative control loop routines. Upon initial startup, indicated at step 801, the processor goes through an initialization routine 802 wherein a number of initial values are set, as depicted in step 804. The parameters, used by the program, are defined and set according to preprogrammed or selected value. The minimum air speed is set at a value below which the aircraft may become instable due to the lack of airflow over control surfaces. The maximum air speed is set at a value above which the incidence of the boom angle will not be significant and the air speed sensor will not operate in a linear range. The dead band is set to limit over controlling of the aircraft due to minor variation such as turbulence or the like. The airspeed sensor (Q-S) status is set to off, allowing manual command of the boom angle. After initialization, processing passes to iterative control loop 803.

Figure 8B:
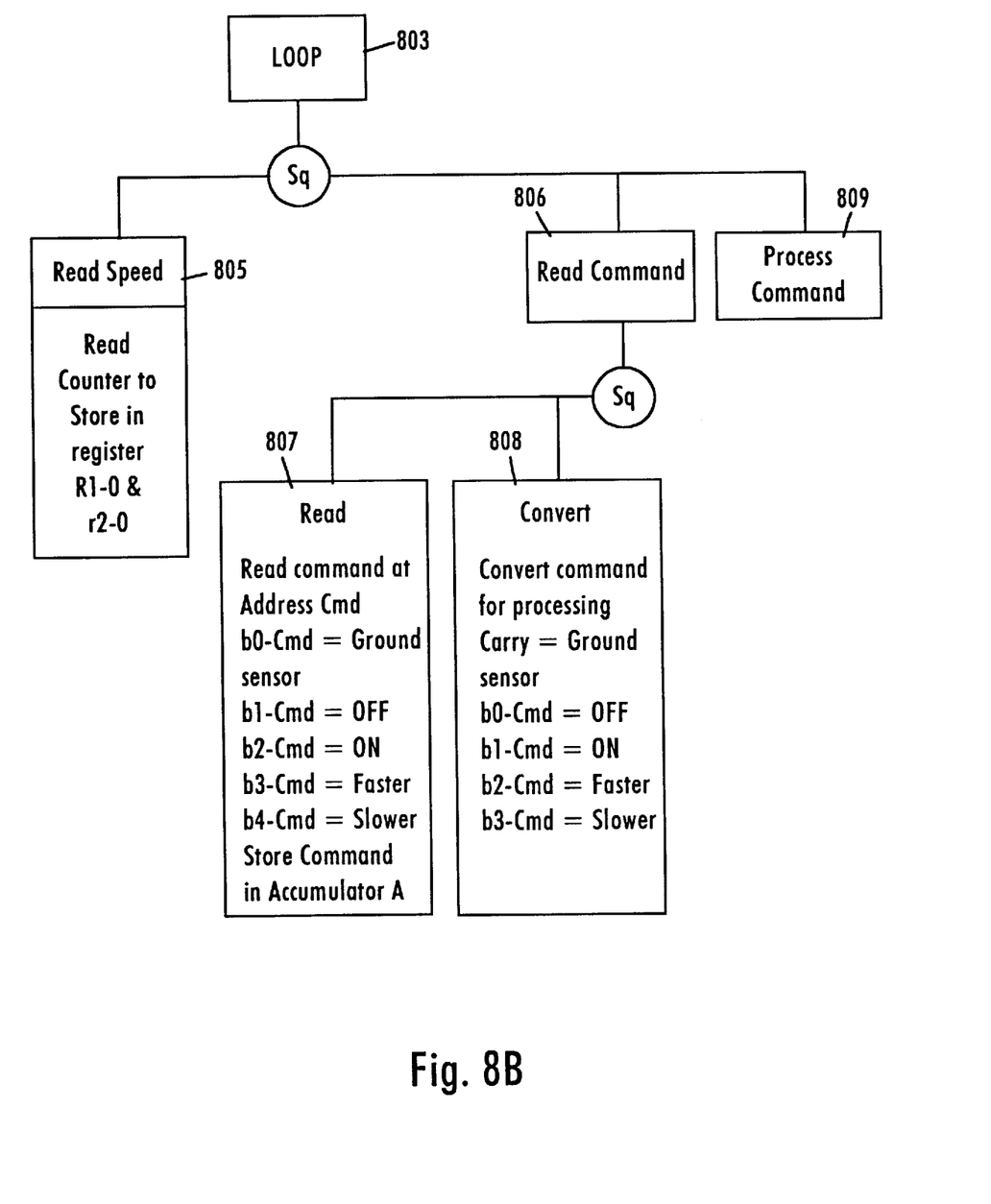

FIG. 8B depicts the sequence for control loop 803. The processor first reads airspeed in step 805 and stores this value in a register. Any conversion necessary to convert airspeed sensor input to a an airspeed value are performed here (e.g., rpm to knots). Next, the processor reads an input command as indicated in step 806. Step 806 includes the sequence of steps 807 and 808. In step 807, the processor reads an input command from an I/O device or input register. In step 808, the read command is modified to a usable format and stopped at a specific address. The major commands of interest are "Faster" and "Slower" (increase or decrease airspeed) which is generally accomplished by a combination of engine speed changes and changes in boom angle for thrust vectoring. The OFF command disables the control loop thus enabling the manual control boom for special purposes. The ON command enables the control loop with all its associated logic described below. In step 808, the commands are converted for processing. In order to accelerate the process of the ground command, the carry is used for the intermediate processing of this command, as discussed below. Processing passes to the process command step 809.

Figure 8C:
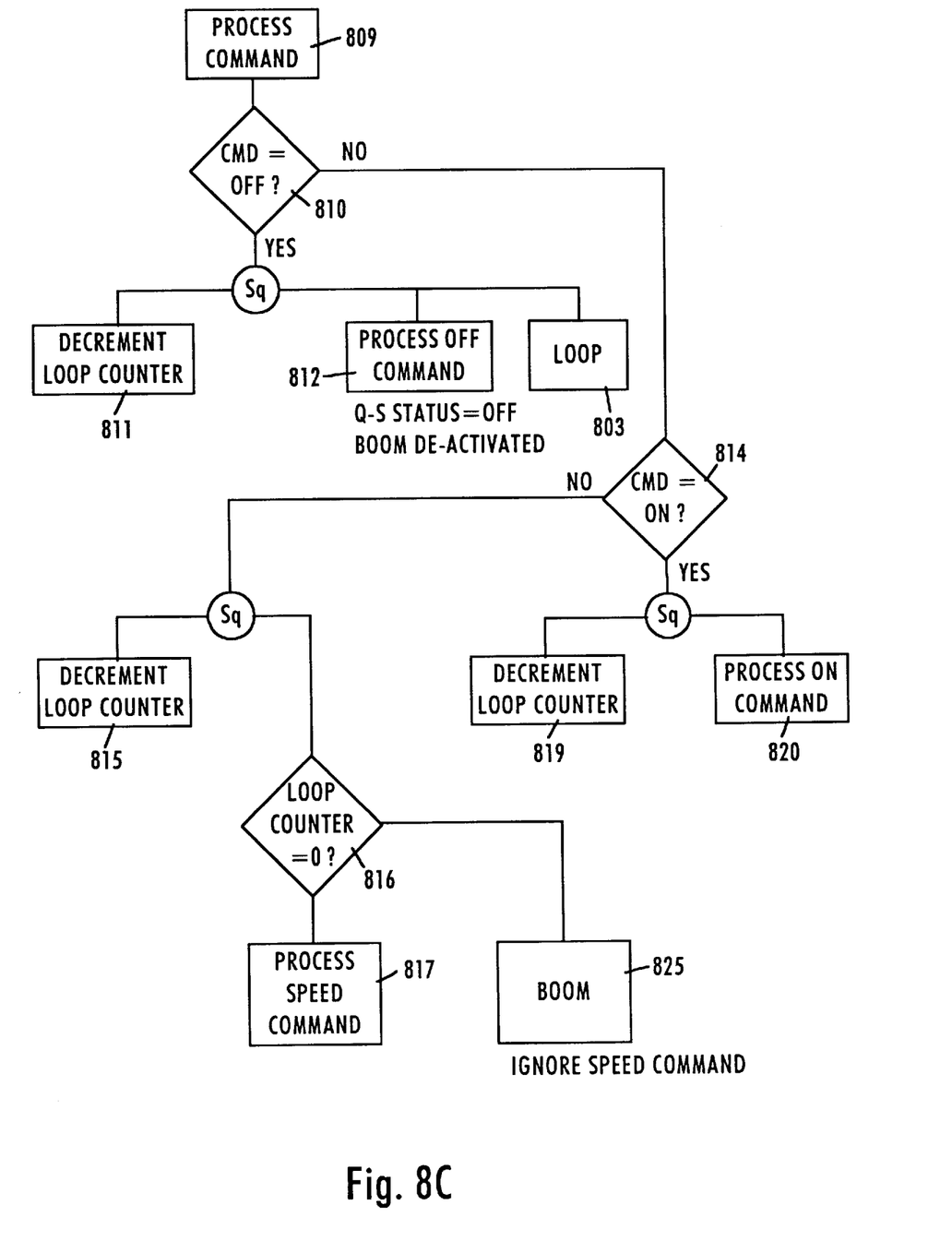

FIG. 8C depicts the process sequence for process command step 809. In decision step 810, register b0 is polled to determine whether an OFF command has been received. The sequence of steps 811, 812, and 803 are followed for the OFF command. In step 811, a loop counter is decremented. In step 812 the air speed sensor (Q-S) status is set to off and the boom control deactivated. In step 803, processing passes back the LOOP sequence described above in connection with FIG. 8B.

If an OFF command has not been received, processing passes to decision step 814 to determine whether an ON command has been received in register b1. If an ON command is present, the loop counter is decremented in step 819 and the ON command is processed in step 820. The ON command is used to reactivate the feedback control of the present invention after an OFF command had be sent, or to reinitialize the feedback control.

Figure 8D:
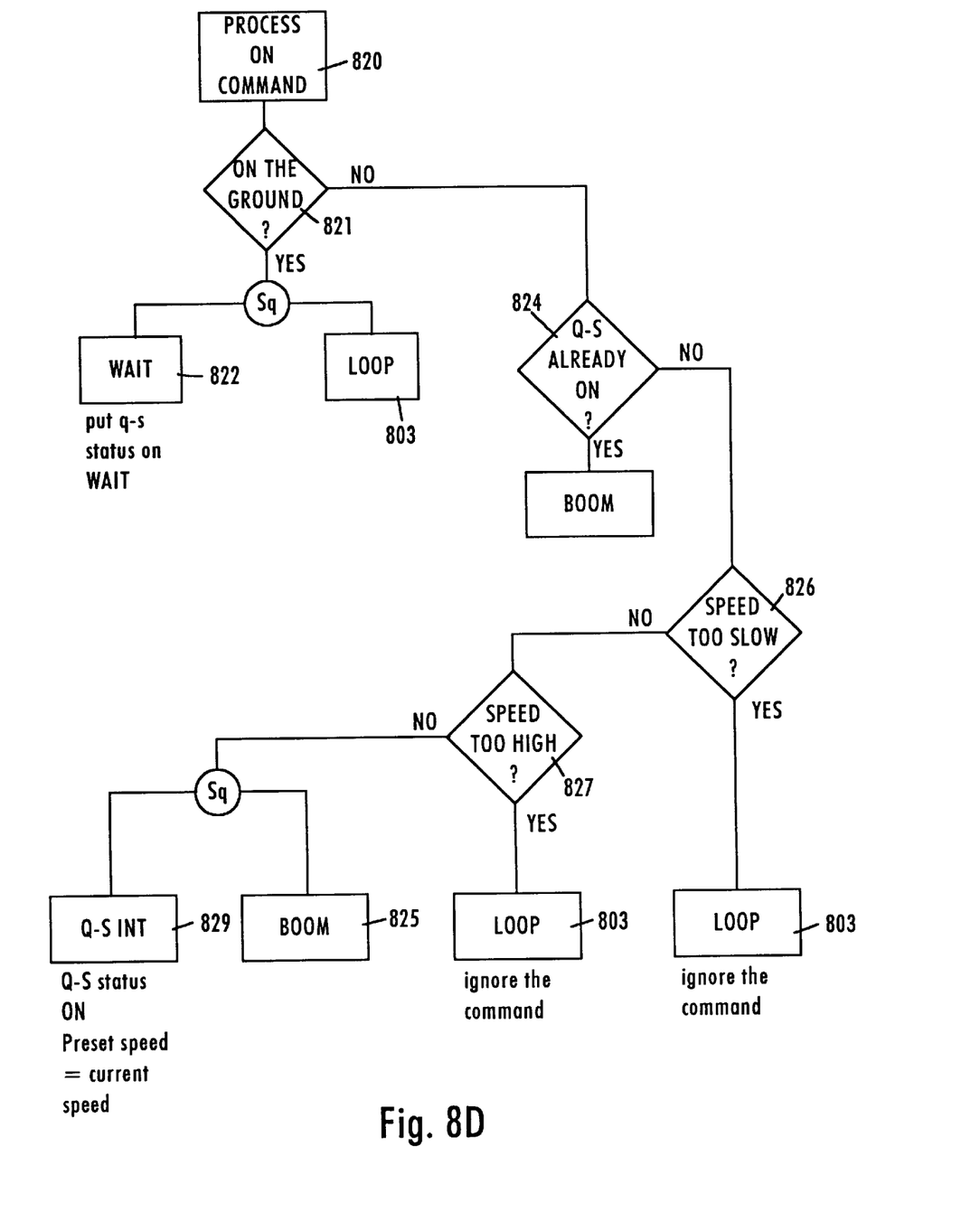

FIG. 8D depicts the sequences in the process ON command step 820. In decision step 821, the control determines whether the aircraft is on the ground. Since the aircraft could be damaged by attempting to move the boom on the ground (or ground personnel could be injured) it may be necessary to disable to boom control when the aircraft is on the ground. A weight on wheel switch or a proximity sensor such a radar, sonar, lidar, or the like may be input to the controller to determine whether the aircraft is in close proximity to the ground. If the aircraft is determined to be on the ground, processing passes to step 822 where a wait status is set. After the aircraft is cleared from the ground, this wait status will be cleared and the ON command will be processed as usual. After step 822, the processing passes back to the loop sequence 803.

If the aircraft is not on the ground, processing passes to step 824 to determine whether the feedback control has already been activated. If the feedback control is already been activated, processing passes to boom step 825 described below in connection with FIG. 8F. If the feed back control has not already been activated, processing passes to steps 826 and 827. Steps 826 and 827 determine whether the aircraft is operating within a speed range defined for the feedback control of the present invention. Since the feedback control is provided primarily for low speeds, the control system may not operate properly during high speed flight. Similarly, if the airspeed is below a preset limit of the feedback control, the system will also fail to operate properly as the aircraft might be in the range of instability due to the lack of airflow over the control surfaces. In this event, the ON command is ignored, and processing passes back to loop 803.

If the aircraft airspeed is within predetermined limits, processing passes the sequence formed by steps 829 and 825. In step 829, the airspeed sensor is initialized, the boom control is set to the ON state, and the preset speed (desired control speed) is set to the current speed. Processing then passes to boom step 825 described below in connection with FIG. 8F.

Referring to FIG. 8C, if an ON or OFF command has not been received, i.e., a FASTER, SLOWER or no command has been received, processing passes to the sequence formed by steps 815 and 816. In step 815, the loop counter is decremented. In step 802, the loop counter is set to an initial value of 5. Thus, the speed command are processed only once every five loops. As a loop is set at the initial time constant of the system, i.e., 0.1 s, a speed command must be activated longer than 0.5 to be processed. In this manner, fast speed changes are avoided. Even if the speed command is to be ignored, i.e., the loop counter has not reached zero, the processing still passes to boom control step 825.

Figure 8E:
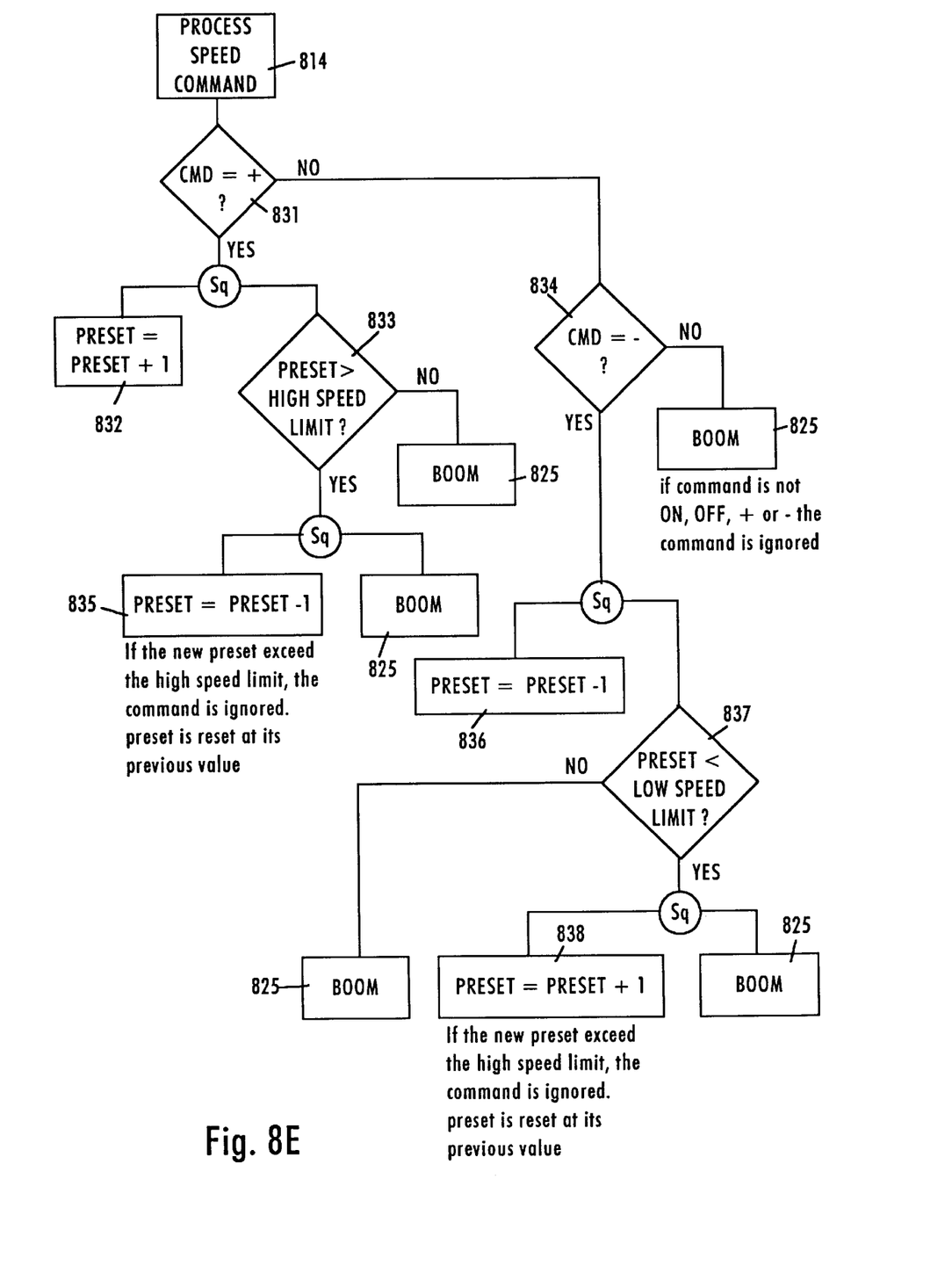

FIG. 8E depicts the sequence for processing an input speed command. From step 817, processing passes to decision step 831. If the input speed command calls for increased speed (i.e., register b2 is high), processing passes to the sequence depicted in steps 832 and 833. In step 832, the preset speed in incremented. Here the preset speed is depicted as being incremented by one, however, other rates of incrementation may be used (e.g., five) to increase the response of the system. In addition the present speed may be in MPH, KPH, knots, or arbitrary units. In this embodiment, the preset speed is the target speed which the aircraft control system attempts to maintain. In decision step 833, it is determined whether the preset speed exceeds an internally set high speed limit. The high speed limit is provided such that the control system will not attempt to control the speed of the aircraft beyond the range suitable for the control system (e.g., beyond the range of the air speed sensor, or high speed flight). If the present speed is below the internally set high speed limit, processing passes to boom control step 825. If the present speed is above the internally set high speed limit, processing passes to steps 835 and 825. In step 835, the preset limit is decremented to its previous value, and processing passes to boom control step 825.

If a decrease speed command is present, as indicated in decision step 834 in FIG. 8E, processing passes to the sequence represented by steps 836 and 837. Otherwise, processing passes to boom control step 825. In step 836, the preset speed is decreased by one or another nominal value as discussed above. The new preset speed is compared to a internally set low speed limit in step 837. This low speed limit is the critical speed discussed above, where the aircraft may enter an unstable region of the performance envelope. If the preset speed is above the internally set low speed limit, processing passes to boom control step 825. If the preset speed is below the internally set low speed limit, the present speed in incremented to its previous value in step 838 and processing passed to boom control step 825.

Figure 8F:
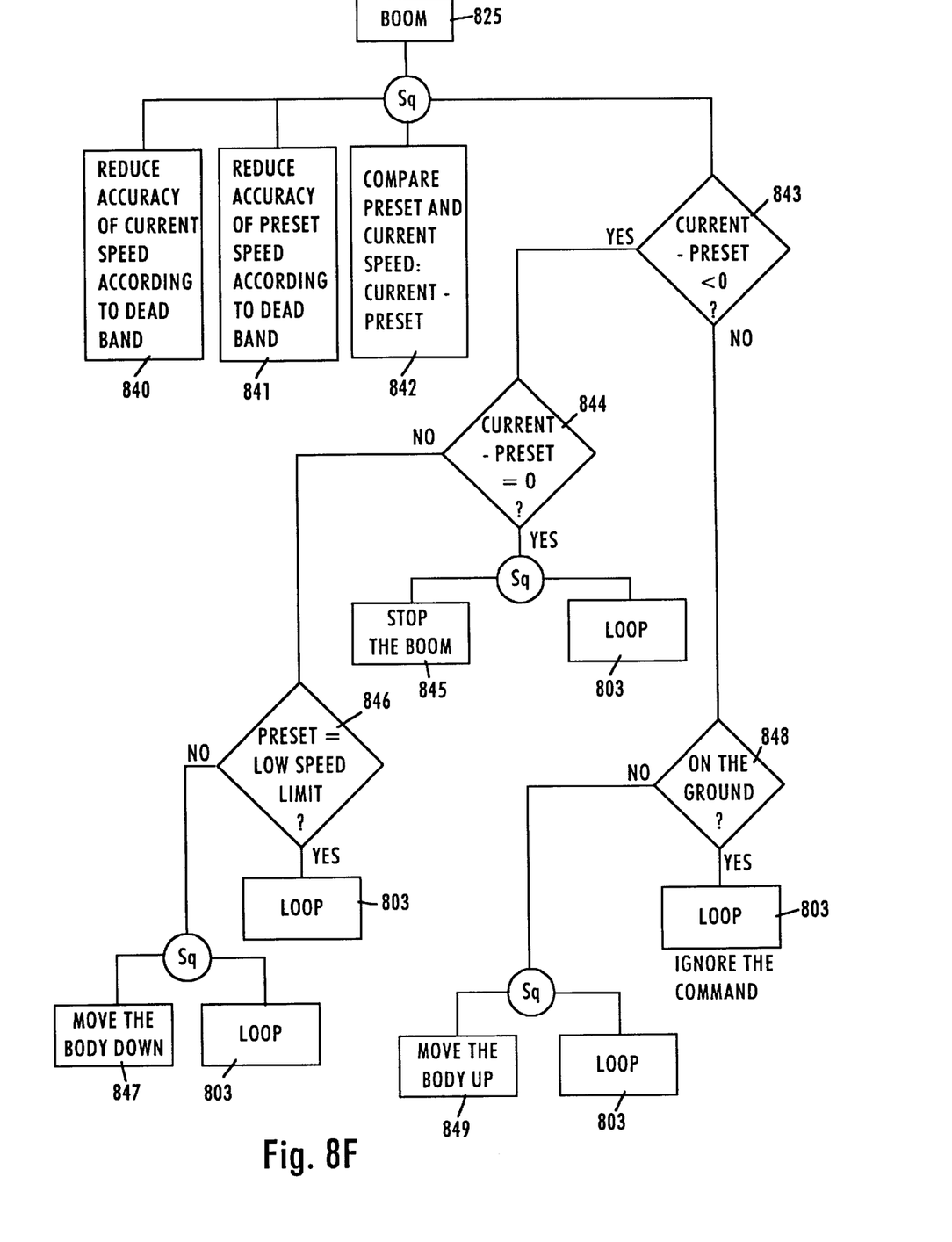

FIG. 8F depicts the sequence of steps for boom control step 825. From step 825, processing passes through a series of steps 840 through 843. In steps 840 and 841 the accuracy of the current (actual) aircraft speed and preset speed are reduced in accordance with the selected deadband. Therefore, the deadband can be ignored in the following processing as it already has been considered. In step 842 the preset speed and correct (actual) aircraft speed are compared. Ideally, the current speed should equal the preset speed, within a predetermined deadband. If the current speed is less than the preset speed (i.e., aircraft is going too slow), as decided in decision step 843, processing passes to decision step 848. In step 848 the processor determines whether the aircraft is on the ground, using weight on wheel switch, proximity sensors or the like as discussed above.

If the aircraft is on the ground, the boom control command is ignored and processing returns to loop step 803. As discussed above, moving the boom (or fuselage) on the ground can result in aircraft damage (e.g., propeller strike) or injury to ground crew. If the aircraft is not on the ground, processing passes to the sequence formed by steps 849 and 803.

In step 849, the body (fuselage) of the aircraft is moved "up" relative to the angle of attack (i.e., the boom is raised relative to the fuselage). In flight, since the free wing and articulated control boom will maintain a relatively constant angle with regard to the angle of attack of the airplane, the fuselage will change angle as a result of changes in boom angle. Changing the angle of the fuselage allows for the use of vectored thrust, decreasing the speed of the aircraft and allowing for near hovering motion. Lowering the boom will allow the aircraft to increase speed.

If the current and preset speed are nearly identical (within the deadband discussed above), as determined in step 844, processing passes to the sequence formed by steps 845 and 803. The boom is stopped (if in motion) and processing passes back to loop 803. Otherwise it is presumed that the current speed is above the present speed (i.e., aircraft is going too fast) and processing passes to step 846. If the preset speed is at the internally set lower limit, as determined in decision step 846, processing in interrupted and returns to loop 803. If the preset speed is not at the lower limit, processing passes to the sequence formed by steps 847 and 803. The body (fuselage) is lowered (i.e., boom is raised) such that the amount of vectored thrust is increased and the aircraft is slowed. Processing then passes to loop 803 and the process continues.

It should be noted that various aspects of the three embodiments of the present invention illustrated herein may be suitable interchanged or used in combination. For example, the flow sensors of FIGS. 6 and 7 may be suitably adapted for use with the embodiment of FIGS. 1 and 2. Similarly, the embodiment of FIGS. 4 and 5 may utilize free wing angle in order to control the angle of the articulated control boom. It will be appreciated by one of ordinary skill in the art that the underlying concept between all three embodiments is the use of a fixed position, angle or speed sensor (three interrelated values) to control a control surface (aileron, trim tab, articulated control boom) to maintain stability of a free wing aircraft.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. In a free wing aircraft including a free wing pivotably coupled to a fuselage, the improvement comprising an aircraft control system comprising:

air speed sensor mounted to the aircraft to measure air speed of the aircraft and output an air speed signal, and a control processor, coupled to the air speed sensor, for receiving and processing the air speed signal from the air speed sensor and a speed control input signal, and outputting a control surface control signal; and a control actuator, coupled to the control processor, for actuating an aircraft control surface in response to the control surface control signal;

wherein the speed sensor comprises:

an angular position sensor, coupled to the free wing and the fuselage, for measuring an angle between the free wing and the fuselage and outputting an angle measurement signal as the air speed signal.

2. A free wing aircraft comprising:

a fuselage, a free wing being rotatably coupled to the fuselage, air speed sensing means for measuring air speed of the free wing aircraft and outputting an air speed signal, a control processor, coupled to the air speed sensing means, for receiving and processing the air speed signal from the air speed sensing means and a speed control input signal, and outputting a control surface control signal, and a control actuator, coupled to the control processor, for actuating a control surface in response to the control surface control signal;

wherein the speed sensing means comprises:

angular position sensing means, coupled to the free wing and the fuselage, for measuring an angle between the free wing and the fuselage and outputting an angle measurement signal as the air speed signal.

3. A method of controlling an aircraft comprising the steps of:

measuring air speed of the aircraft and outputting an air speed signal, processing the air speed signal with a speed control input signal and outputting a control surface control signal, and actuating an aircraft control surface in response to the control surface control signal;

wherein the aircraft comprises a free wing aircraft including a free wing and a fuselage, the free wing being rotatably coupled to the fuselage, and the step of measuring further comprises the steps of:

measuring an angle between the free wing and the fuselage and outputting an angle measurement signal as the air speed signal.

* * * * *